United States Patent
Yonak

(10) Patent No.: US 9,250,315 B2
(45) Date of Patent: Feb. 2, 2016

(54) COLLISION AVOIDANCE SYSTEM AND METHOD

(75) Inventor: Serdar H. Yonak, Ann Arbor, MI (US)

(73) Assignee: Toyota Motor Engineering & Manufacturing North America, Inc., Erlinger, KY (US)

(*) Notice: Subject to any disclaimer, the term of this patent is extended or adjusted under 35 U.S.C. 154(b) by 965 days.

(21) Appl. No.: 12/397,552

(22) Filed: Mar. 4, 2009

(65) Prior Publication Data
US 2010/0228482 A1  Sep. 9, 2010

(51) Int. Cl.
| | |
|---|---|
| G06G 7/78 | (2006.01) |
| G01S 7/52 | (2006.01) |
| G01S 3/808 | (2006.01) |
| G01S 5/18 | (2006.01) |
| G08G 1/16 | (2006.01) |

(52) U.S. Cl.
CPC ........... *G01S 7/52001* (2013.01); *G01S 3/8083* (2013.01); *G01S 5/18* (2013.01); *G08G 1/166* (2013.01)

(58) Field of Classification Search
USPC ........................................................ 701/301
See application file for complete search history.

(56) References Cited

U.S. PATENT DOCUMENTS

| | | | | |
|---|---|---|---|---|
| 4,015,232 | A | | 3/1977 | Sindle |
| 4,626,850 | A | * | 12/1986 | Chey .............................. 340/903 |
| 5,576,972 | A | | 11/1996 | Harrison |
| 5,734,336 | A | * | 3/1998 | Smithline .............. B60Q 9/008 180/168 |
| 5,798,983 | A | | 8/1998 | Kuhn et al. |
| 6,227,036 | B1 | | 5/2001 | Yonak et al. |
| 6,574,560 | B2 | | 6/2003 | Abe et al. |
| 6,680,688 | B1 | | 1/2004 | Jiang et al. |
| 7,095,361 | B2 | | 8/2006 | Mattes et al. |
| 7,248,153 | B2 | | 7/2007 | Danz et al. |
| 2002/0003378 | A1 | * | 1/2002 | Marcus et al. ............... 307/10.1 |
| 2007/0286680 | A1 | * | 12/2007 | Simon ....................... B09C 1/00 405/128.1 |
| 2008/0024323 | A1 | * | 1/2008 | Kadaba ......................... 340/905 |
| 2008/0170472 | A1 | | 7/2008 | Yonak |
| 2009/0157293 | A1 | * | 6/2009 | Cornett et al. ................ 701/200 |
| 2010/0010742 | A1 | * | 1/2010 | Mochizuki .................... 701/301 |
| 2010/0157736 | A1 | * | 6/2010 | Riordan et al. ................. 367/88 |

OTHER PUBLICATIONS

Dowling, David F., Jackson, Darrell R., "Narrow-band performance of pghase-conjugate arrays in dynamic random media," J. Acoust. Soc. Am. 91 (6), Jun. 1992.

Fiakowski, Laurie T., Collins, Michael D., Perkins, John S., "Source localization in noisy and uncertain ocean environments," J. Acoust. Sac. Am., 101 (6), Jun. 1997.

Chen, Bin, Meguro, Mitsuhiko, Kaneko, Masahide, Probabilistic Integration of Audiovisual Information to Localize Sound Source in Human-Robot Interaction, Robot and Human Interactive Communication, 2003. The 12th IEEE Interactive Workshop Proceedings, ROMAN 2003, pp. 229-234.

* cited by examiner

*Primary Examiner* — Valerie Lubin
*Assistant Examiner* — Reginald R Reyes
(74) *Attorney, Agent, or Firm* — Dinsmore & Shohl LLP

(57) ABSTRACT

Apparatus and methods for assisting collision avoidance between a vehicle and an object include receiving an acoustic signal from the object using microphones supported by the vehicle, and determining a location of the object using the acoustic signal and an acoustic model of the environment, the environment including a structure that blocks a direct view of the object from the vehicle.

23 Claims, 7 Drawing Sheets

COLLISION AVOIDANCE SYSTEM AND METHOD

FIELD OF THE INVENTION

The present invention relates to methods and apparatus for collision avoidance, in particular in relation to automobiles.

BACKGROUND OF THE INVENTION

Collision avoidance is an important aspect of safe vehicle operation. However, conventional approaches are restricted to line-of-sight detection of objects.

SUMMARY OF THE INVENTION

Examples of the present invention include collision avoidance apparatus and methods to warn a vehicle operator of objects that are hidden from view. In some examples, a plurality of microphones is provided on the vehicle which detect acoustic signals from the object, and the acoustic signals can be used to determine a position of the object, even if the object is out of the direct line of sight of a vehicle operator or other vehicle sensor. The acoustic signal of the object can be characterized, and used to identify the object.

In some examples below, the term "object" is used to refer to a potential collision hazard. For automobile applications, potential collision hazards include other vehicles, pedestrians, and the like. The vehicle may be a land vehicle, such as an automotive vehicle, and the vehicle operator may be the driver of an automobile.

In some examples, a warning may be provided when the vehicle is located at or proximate an intersection, where the driver's vision or other sensor detection is obstructed, for example due to a building at the corner of the intersection.

The detected acoustic signals may include a band of frequencies, for example within the range 1 Hz-20 kHz. Acoustic signal characteristics can be used to locate and identify the nature of the detected object. For example, the amplitude and phase of the acoustic signal at a plurality of microphones can be used to locate the object, and the spectral distribution may be used to identify the type of object. For example, a driver may be warned of the presence and location of an object (acting as the source of the acoustic signal), even if the object is not visible to the driver due to an intervening building or other structure. In effect, the detection of acoustic signals allows objects to be detected around a corner.

An example method of assisting collision avoidance comprising providing a plurality of microphones on the vehicle, receiving an acoustic signal from the object using the microphones, filtering the acoustic signals, and determining a location of the object using matched field processing, using the acoustic signal and an acoustic model of the environment.

A matched field processor (MFP) may be provided by a computer having a processor, a memory, and a clock, and the computer may be used to provide other functionality such as communicating with a navigation system. An MFP can be used to determine the object location by receiving the acoustic signal using microphones supported by the vehicle, and using the microphone signals in combination with an acoustic model to determine the object location.

In some examples, the environment includes one or more structures (such as a building) that block a direct view of the object from the vehicle. For example, the environment may include an intersection, and the structure may be a building near a corner of the intersection. Conventionally, the object may not be detectable using line-of-sight sensors. However, the acoustic signal may propagate from the object to the vehicle around a corner of the structure, allowing determination of the object location.

For example, an acoustic signal may diffract or reflect around the corner. An acoustic model of the environment allows the location of the object to be determined from the received acoustic signal. An acoustic model of the intersection can be generated using the arrangement of structures within the environment.

In some examples, a position sensor on the vehicle is used to identify the intersection and retrieve topographic data from a memory device, which may be within the vehicle or stored elsewhere. The topographic data can then be used to generate an acoustic model of the environment.

The acoustic model of the environment can be generated using topographic data including a previously determined arrangement of structures at the intersection. For example, topographic data may include mapping data relating to building locations. In some examples, the configuration of intersections can be retrieved from a remote location, such as a remote computer network, using a wireless communications link. Retrieval can be performed before an intersection is encountered, based on the location and heading of a vehicle. In some examples, the configuration of intersections can be stored within an internal memory of a computer used to analyze the acoustic signals.

A position sensor can be used to determine the location of the vehicle, and hence generate an acoustic model using topographic data, such as a previously determined arrangement of buildings or other structures. The position sensor may use one or more approaches, such a global positioning system (GPS), dead reckoning using distance and heading data (for example, if GPS becomes temporarily unavailable), cell phone triangulation data, image recognition of location-identifying elements within the environment (such as road signs, street names, building names, business names, and the like), and/or a comparison of any available data with stored map data.

Hence, in a representative example, an acoustic model can be being created using an approximate intersection geometry obtained using GPS data. The GPS data establishes the position of the vehicle, and this may be used to retrieve a local building configuration from a database. An example database is a map database that includes data relating to roads and further includes data relating to building arrangements around intersections of such roads.

In some examples, an acoustic model can be determined using data from one or more other sensor systems, such as a radar sensor, a laser sensor, a lidar sensor, and an image sensor. The configuration of structures may be determined from line of sight sensors by assuming the shape of the structures within the environment. For example, structures may be assumed to be buildings having a generally rectangular cross-section in a horizontal plane. Walls of structures on opposite sides of a road may be assumed to be parallel.

The acoustic signal can be received using a plurality of microphones supported by the vehicle. In some examples, a microphone array may comprise a plurality of MEMS (micro-electro-mechanical systems) microphones. A microphone array may be integrated with vehicle trim components such as the bumper fascia, side moldings, and the like. Microphones may be located behind any trim component of the vehicle (such as a bumper component), for example at least one microphone array may be located behind the front bumper cover of the vehicle. In some examples, a trim component may include acoustic cavities tuned to match the impedance of the microphone.

An acoustic method for collision avoidance takes advantage of the fact that sound can diffract around a corner and reflect from buildings. Also, the time dependence of the detected acoustic signal can be analyzed to detect late returns due to reflections, and these can be processed to help determine the position of the object.

An example collision avoidance system for a vehicle comprises microphones supported by the vehicle operable to receive the acoustic signals from the object, a matched field processor receiving signals from microphones, and using an acoustic model of the environment to determine the location of the object, and an alert device providing an indication of the object location. A matched filter can be provided for each microphone, providing noise rejection. The collision avoidance system may also include (or receive signal from) a position sensor providing a position signal used to determine the acoustic model.

Each microphone may have an associated acoustic filter, such as a band-pass filter. An acoustic filter can be provided by an electronic circuit, signal processing, other approach such as mechanical structures, or some combination of such approaches. The upper and lower band-pass frequencies may be matched to the expected acoustic signal from a particular object. For example, if the object is a vehicle, the band-pass filter may be matched to acoustic signals generated by a vehicle engine. For example, the lower band-pass frequency may be in the range 10 Hz and 1 kHz, and the upper band-pass frequency may be in the range 2 kHz-20 kHz.

DETAILED DESCRIPTION OF THE INVENTION

Figure 1:
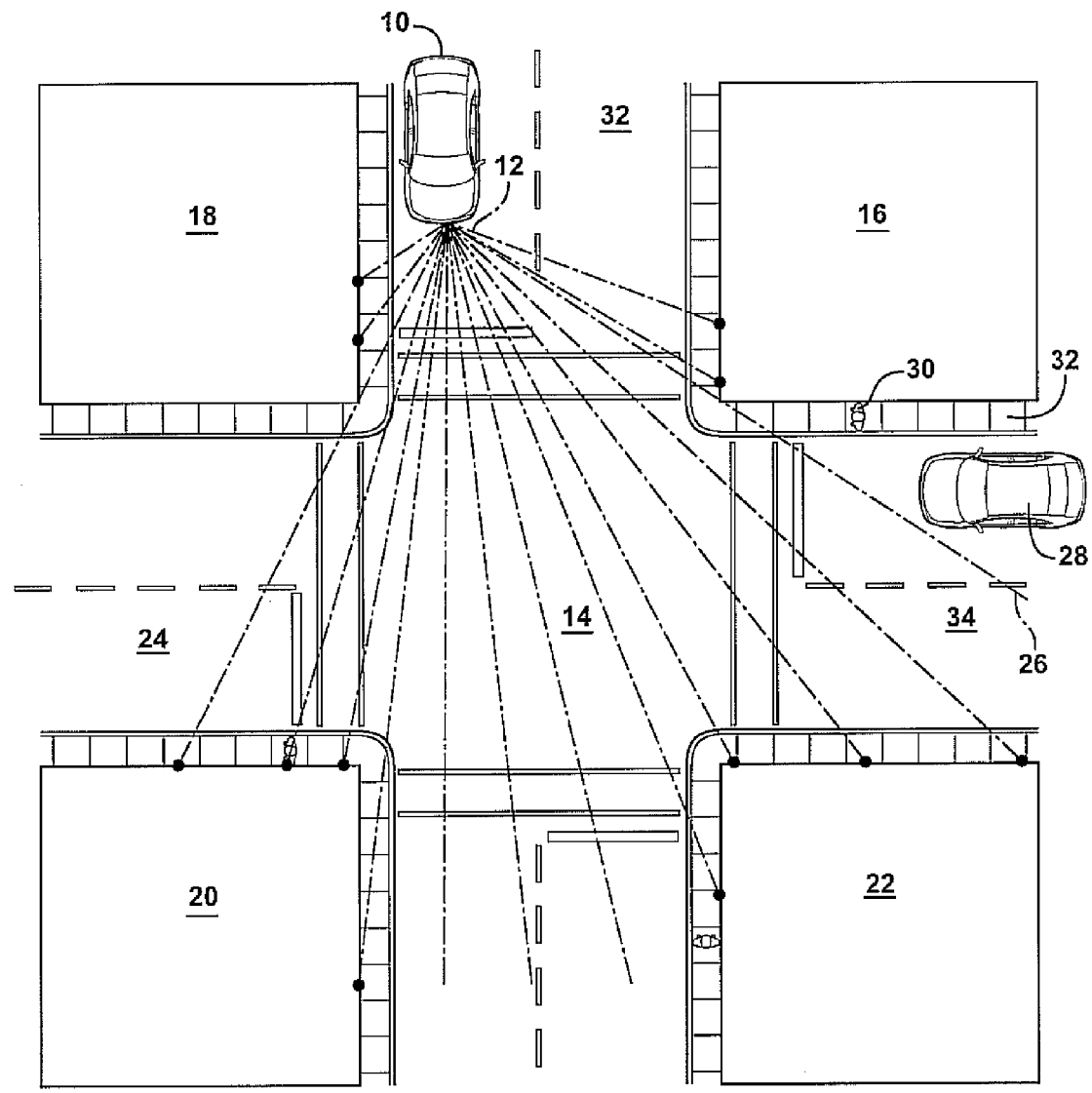
FIG. 1 shows a vehicle approaching an intersection, with potential collision hazards out of the line of sight of the driver.

Examples of the present invention include collision avoidance systems and methods that can warn a driver of hidden objects at, near, or approaching an intersection. The object, such as another vehicle or a pedestrian, may be visually concealed from the driver by visual obstructions such as buildings, and may be undetectable using line-of-sight sensors because of these visual obstructions. In some examples, a plurality of acoustic sensors is used to receive an acoustic signal from the object. These acoustic signals can propagate around visual obstacles, for example by diffraction and/or reflection processes around a structure such as a building.

An acoustic method allows a vehicle operator to be alerted to possible collision hazards that are out of sight, for example located around a corner. An array of microphones can be used to receive acoustic signals, in some examples including MEMS microphones. An acoustic model can be created using topographic data, allowing the object location to be determined using matched field processing (MFP).

Vehicle and/or pedestrian sounds can scatter, reflect, or otherwise propagate around a corner of the building, allowing detection of an acoustic signal from an object that is hidden from view by the building. The acoustic signal can be detected by an array of microphones. The frequency of the detected acoustic signal may be in the range 1 Hz-20 kHz, for example in the range 100 Hz-15 kHz. These frequency ranges are exemplary and not limiting.

An example method of assisting collision avoidance between a vehicle and an object includes receiving an acoustic signal from the object using microphones supported by the vehicle, and locating the object using matched field processing of the acoustic signal, using an acoustic model of the environment. An alert can be given to the vehicle operator to assist collision avoidance.

For example, the environment may include an intersection a road on which the vehicle is located, and another intersecting road on which the object is located. Conventionally, a vehicle operator would not become aware of the object until it came into view, at which point a collision may become more difficult to avoid. However, by receiving acoustic signals, which may travel around a corner of a building, the object may be detected earlier, assisting collision avoidance.

One or more other sensors can be used to determine topographic data. For example, a laser radar (lidar) sensor, radar sensor, camera, other imaging or range-finding sensor, or other sensor (or combination of sensors) can be used to determine the arrangement of structures (such as buildings) proximate an intersection.

In some examples, vehicle position data, such as GPS data, can be used to gather topographic data such as intersection configuration, such as including building arrangement around the intersection. Approximate building geometry may be obtained from GPS data or other data.

An alert can be given to the driver using an alert device, which may indicate one of more of the following characteristics of the object: a location, direction (heading), speed, and object type. An acoustic signal can be characterized and used to identify the object, and to warn the vehicle driver of the position of the object acting as a sound source (e.g. a car, pedestrian, train, and the like).

The acoustic signal is received by a microphone array, and signals from the microphones may be filtered to reduce noise component. Alternatively, or in addition, the microphones may be configured to have an acoustic spectral response matched to the acoustic signals desired to be detected.

In some examples, the object may be a second vehicle approaching the intersection, and the second vehicle may not be visible by the vehicle operator. Microphones on the vehicle are used to detect an acoustic signal, which may include engine noise, tire noise, and the like. The second vehicle may be identified by type (e.g. automobile, truck, bus, train, tram, or other vehicle type) by analysis of the detected acoustic signal. The path of the second vehicle may be tracked by dynamic modeling. In some cases, detection of a Doppler shift may also be used to detect acceleration. In some examples, the object may be a pedestrian, and the acoustic signal may include speech, footsteps, or other components.

FIG. 1 shows a vehicle 10, having a conventional line of sight sensor 12, approaching an intersection 14. The intersection 14 is formed between a first road 32 on which the vehicle is traveling, and a crossing road 34. There are structures, in this case, buildings 16, 18, 20, and 22, at the corners of the intersection. Objects presenting a collision risk include a second vehicle 28 and pedestrians such as 30 on sidewalk 32.

In this case, the line-of-sight sensor cannot detect the objects, because structure 16 blocks a direct view of these objects, as shown by the line of sight 26. Areas such as 24 are outside the field of view of a line of sight sensor.

Figure 2:
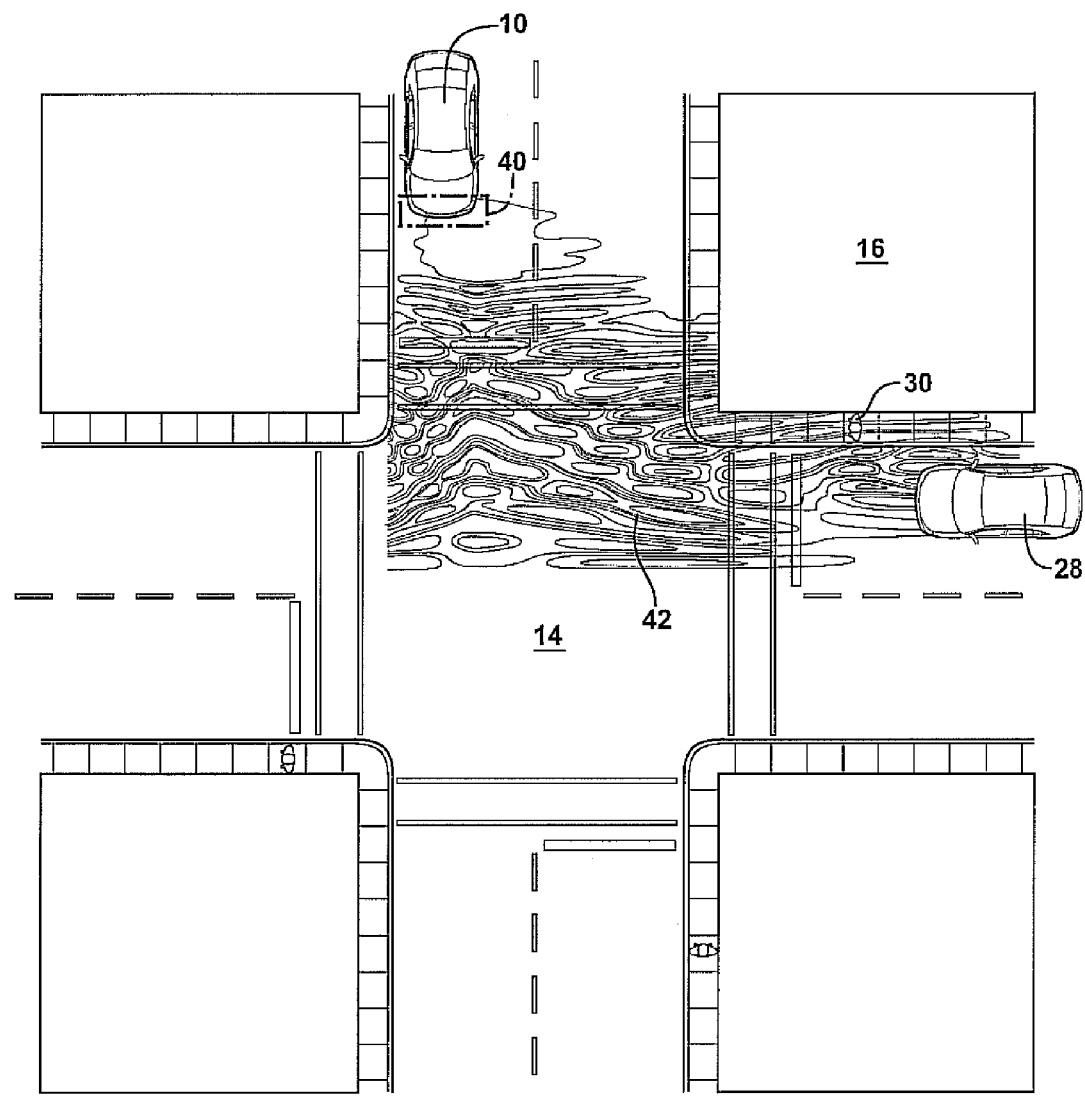
FIG. 2 is a representation of acoustic signals originating from the potential collision hazards, which are detected by a microphone array on the vehicle.

FIG. 2 shows the vehicle 10 proximate the intersection 14, as discussed above in relation to FIG. 1. The figure shows part of an acoustic field 42, including acoustic signals originating from the second vehicle 28 and the pedestrian 30. In this example, the acoustic signals are received by a microphone array located at the front of the vehicle 40. Even though the objects 28 and 30 are around the corner of building 16, and out of sight of the driver, the microphone array can detect the acoustic signals from them.

Figure 3:
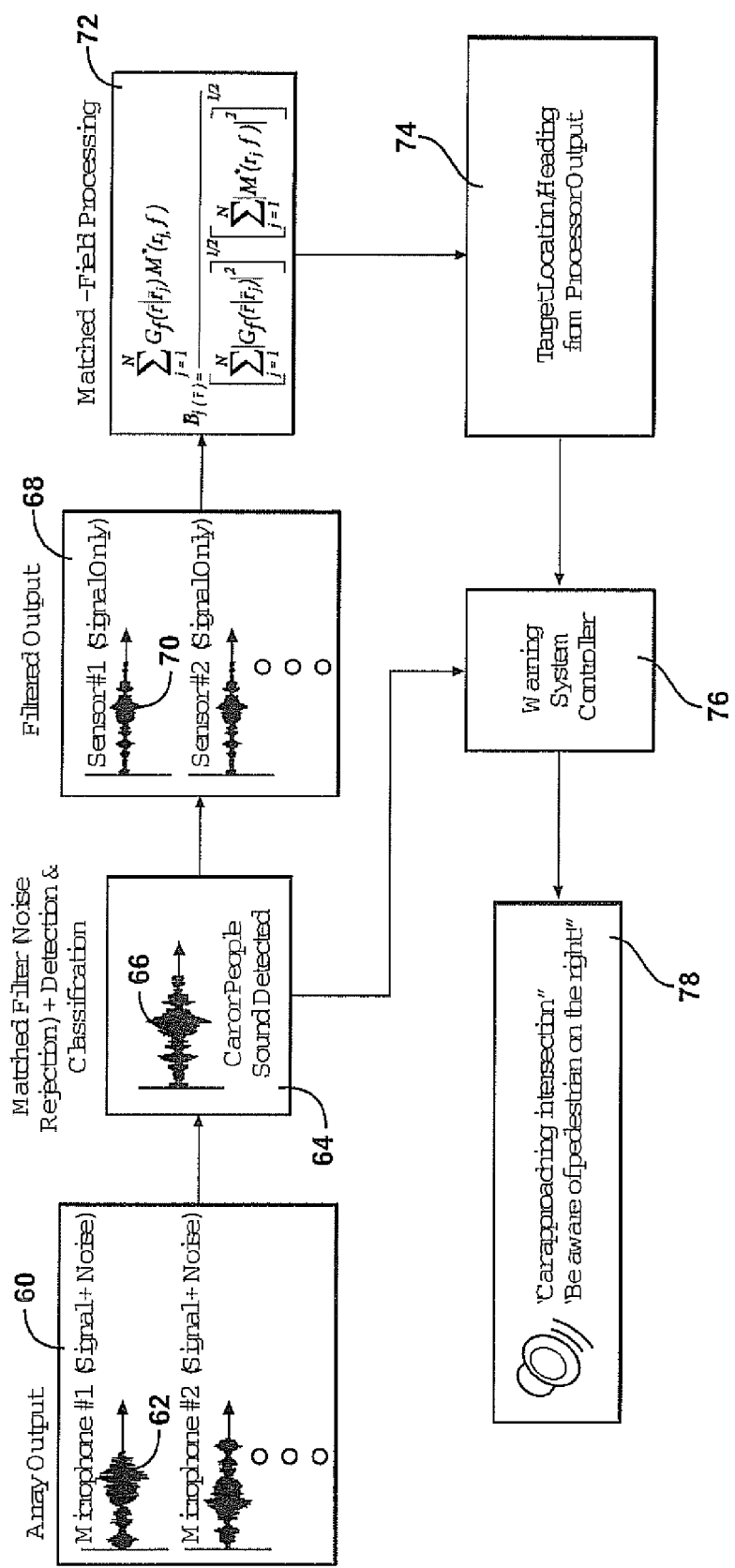
FIG. 3 is a flow chart of a possible approach to acoustic signal processing, hazard detection, and warnings.

FIG. 3 is a schematic of a possible method. Box 60 corresponds to using a microphone array supported on the vehicle to receive acoustic signals along with noise signals. The included graphic 62 corresponds to a microphone signal representative of the acoustic signal and a noise component. Box 64 corresponds to filtering the signals from each microphone. The included graphic 66 corresponds to a filtered microphone signal, in this example the filtering removing a low frequency noise component.

Box 68 corresponds to outputting a set of filtered microphone outputs. Box 74 corresponds to determining the location of one or more objects using a matched field processor, using the acoustic signal and an acoustic model of the environment including the objects. For example, the matched field processor may be provided by a computer including a processor and associated electronic components. Box 74 corresponds to outputting target location and heading information. The heading information may be determined from collecting acoustic signals over a period of time and determining the change in location of tracked objects (which here are called targets). Box 76 corresponds to passing the target location/heading information to warning system. The warning system may also receive data corresponding to the identification of the type of object being tracked. This may be achieved using spectral analysis of an acoustic signal (e.g. at a stage corresponding to box 64, as shown).

Box 78 corresponds to providing a warning to the driver of the vehicle. The alert may include a visual alert (for example, including illumination of a lamp), audible alert (such as synthesized speech, tone, buzzer, or the like), haptic alert, or other alert. The alert may include information such as the direction of the object, for example: an illuminated arrow; synthesized speech including words such as ahead, left, or right; an audible signal appearing to come from the direction of the hazard. The alert may also include an indication of the type of object detected, such as an automobile, truck, pedestrian, or animal.

Figure 4:
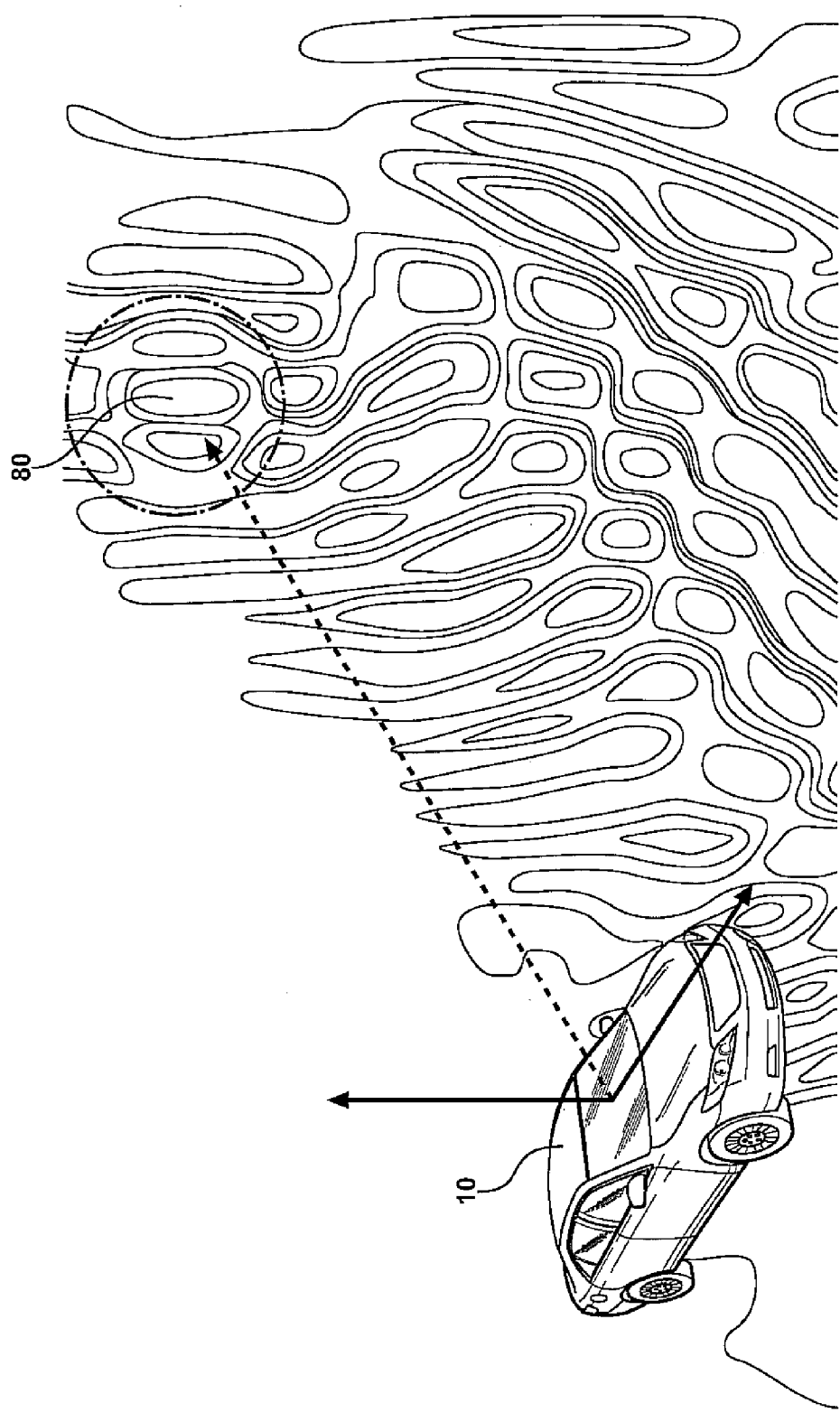
FIG. 4 represents acoustic signals originating from a hazard, with position determined from the acoustic signals.

FIG. 4 shows a vehicle 10 receiving an acoustic field including acoustic signal from object 80. By providing a plurality of microphones, the acoustic field can be sampled at different spatial locations. The location of the object can be determined if an acoustic model of the environment of the object is known. In this example, the environment preferably includes any structure that has an appreciable effect on the acoustic field distribution at the vehicle. However, approximations can be made, for example by neglecting relatively distant structures.

Figure 5:
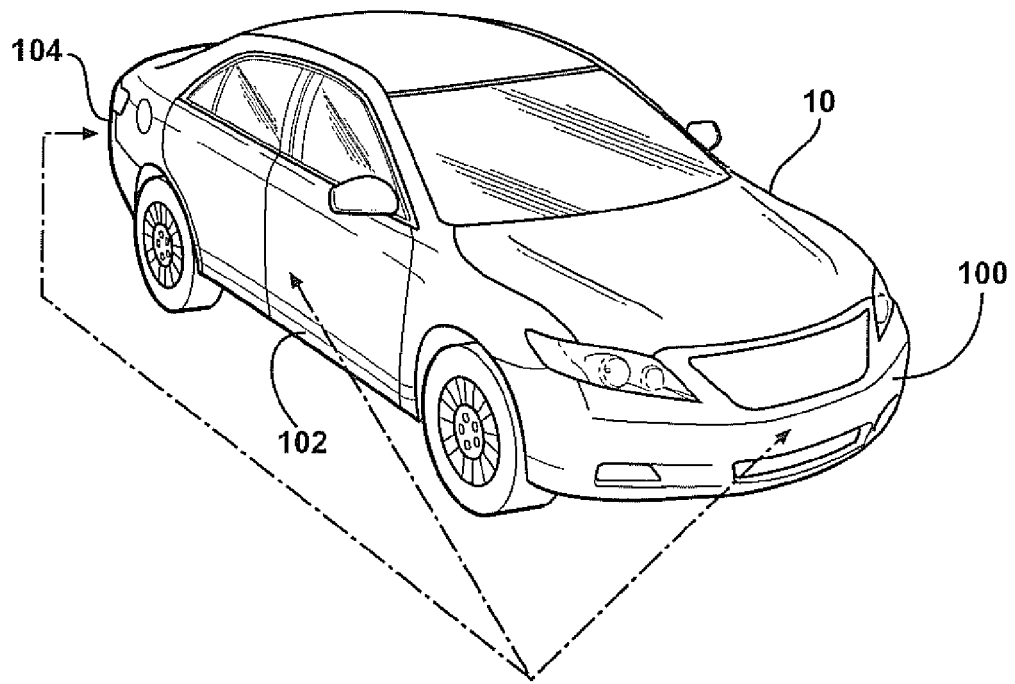
FIG. 5 shows possible locations for microphone arrays on a vehicle.

FIG. 5 illustrates possible locations for microphones on a vehicle 10. For example, microphones may be located proximate the front bumper 100, within a side panel such as 102, or at the rear 104.

Figure 6:
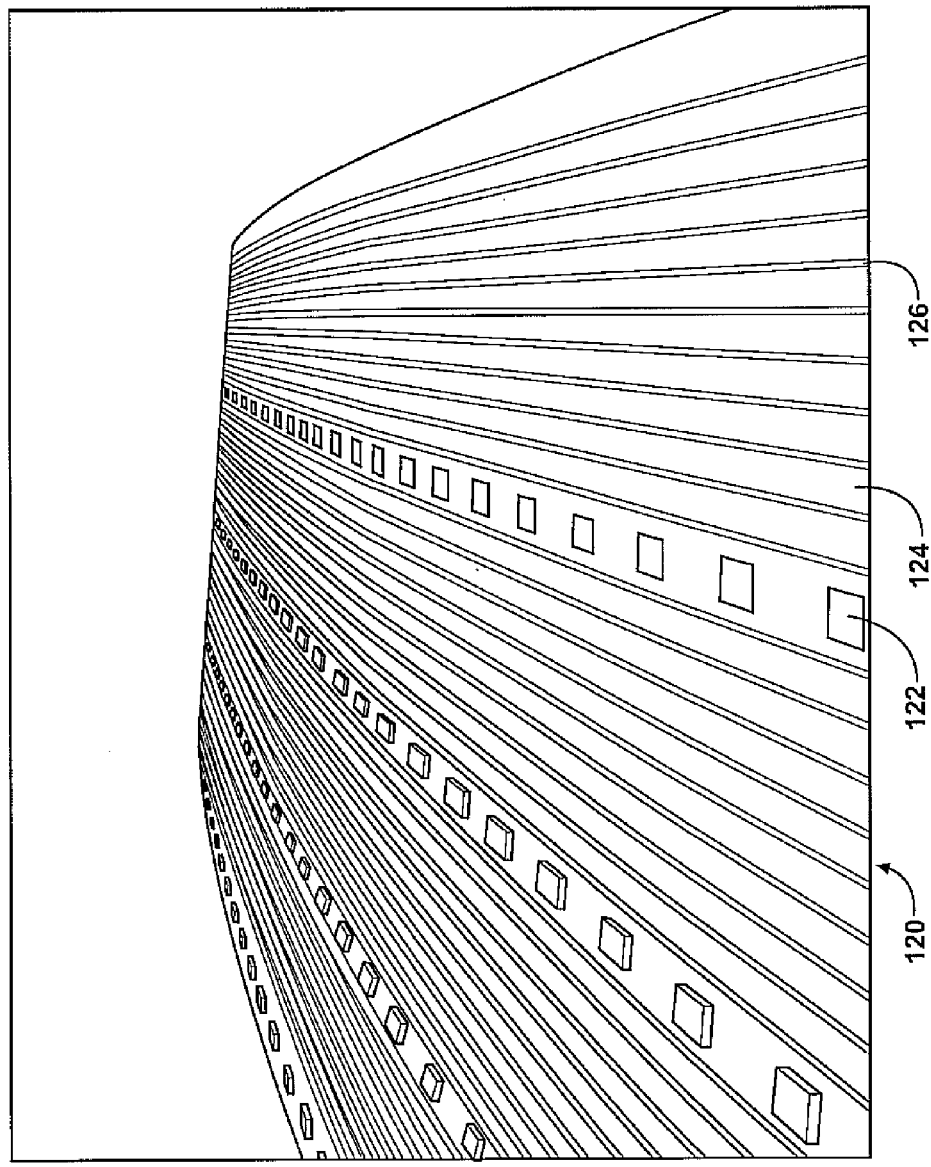
FIG. 6 shows MEMS microphones arranged as an array on a substrate.

FIG. 6 shows a microphone array 120, in this example an array of MEMS microphones 122 on a substrate. In this case, the substrate is a ribbon cable, including electrode stripes 124 on a flexible polymer backing 126.

Figure 7:
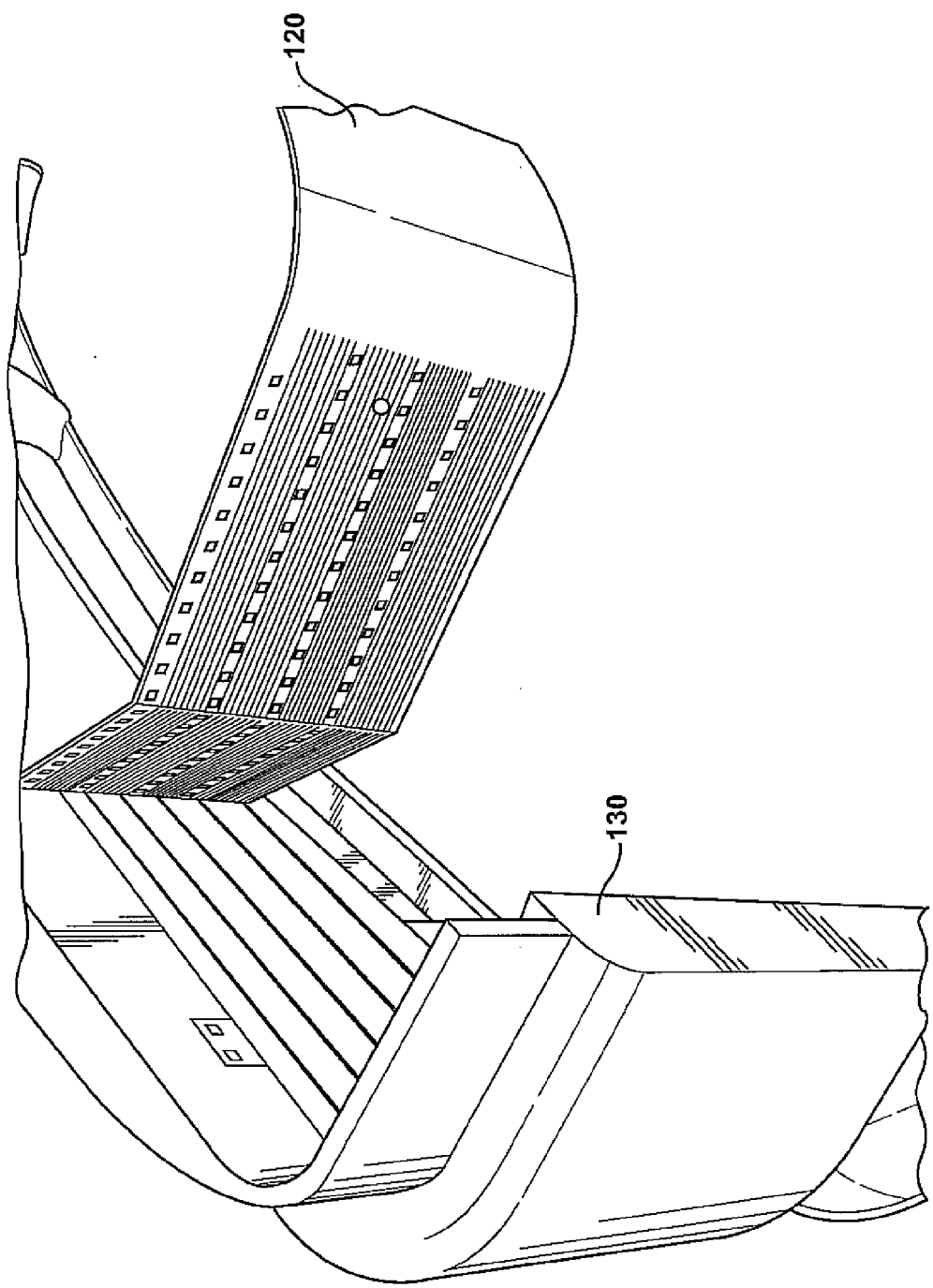
FIG. 7 shows a microphone array located behind a vehicle bumper.

FIG. 7 shows a possible arrangement of a microphone array behind a bumper component. The figure shows microphone array 120, for example as described above in relation to FIG. 6, configured to be located behind a portion of the bumper cover 130. In this context, the location behind the bumper conceals the microphone array from view from a person looking at the front of the vehicle. The bumper cover material can be chosen so as not to greatly attenuate the acoustic signal. When assembled, portions of the bumper cover may be proximate or adjacent the microphone array 120.

Figure 8:
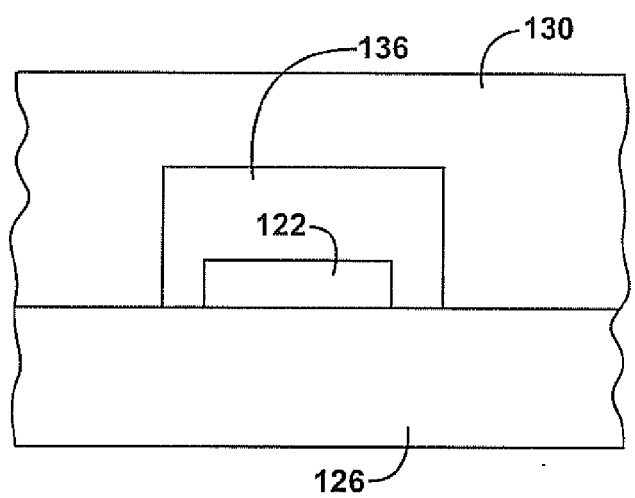
FIG. 8 shows an acoustic cavity used to improve signal detection.

FIG. 8 shows a possible configuration in cross-section, in which a MEMS microphone 122 is located on flexible backing 126, in this example the flexible polymer backing of a ribbon cable. A cavity 136 is formed as an indentation within the bumper material 130, which acts as an acoustic resonator for the microphone. A vehicle trim part, such as a bumper cover, may include an array of such indentations, and the microphone array can be spatially registered to the indentations.

Object Detection

The detected object may be a collision hazard, such as a vehicle or pedestrian. The spectral properties and/or modulation of the acoustic signal produced by the object may be used to identify the object type, for example in terms of engine type, vehicle type and the like.

Examples of the present invention can also be used to detect the direction of approach of an emergency vehicle, such as a police car, ambulance, fire engine, or other vehicle. The type of vehicle may, if desired, be identified by the acoustic signature of the siren, for example a police siren, an ambulance siren, or a fire engine siren can be detected.

Warnings to the driver may include visually discernable alerts, such as an information display, acoustic signals, and/or haptic signals.

Other Applications

Examples illustrated herein include collision avoidance for passenger vehicles, such as automobiles, trucks, and the like. However, examples of the present invention are not limited to passenger vehicles and may also be used with any land vehicle, such as a train. Examples also include aircraft, for example to detect acoustic signals from other aircraft.

In some examples, one or more transducers (such as a speaker on the vehicle) can be used to generate an acoustic excitation pulse, and the acoustic signal received may be that excited by the acoustic pulse. The excitation pulse frequency and/or envelope may be selected to induce resonance or otherwise enhance the excited acoustic signal. The excitation pulse may include infrasound or ultrasound components, and/or may be audible to a human. Stationary objects, such as parked vehicles and barriers, may then produce an acoustic signal and may be located using matched field processing. The excitation pulse may also go around corners, as with the detected acoustic signal, allowing detection of objects around a corner.

Some examples described herein relate to automotive vehicles driven on public roads. However, examples of the present invention include apparatus and methods for collision avoidance of other vehicles, including airplanes (including helicopters), other flying vehicles (including flying cars and the like), other personal conveyances (including jet-packs, two-wheeled self-balancing electric vehicles, bicycles, and the like), boats, aircraft, and other vehicles.

Environment Model

An acoustic model (which may also be referred to as a propagation model) of the environment is used to determine the location of objects from a received acoustic signal. The acoustic model may be created from topographic data related to the environment, for example the arrangement of buildings around an intersection. For example, the properties of a building wall may be assumed based on typical acoustic properties, or building specific data may be previously obtained and used in a model. In some examples, two-dimensional data are used as an approximation. In some examples, a three-dimensional arrangement of buildings can be obtained from a database.

One or more sensors, such as a line-of-sight sensor, can be used to determine the arrangement of buildings near an intersection for use in creating an acoustic model of the intersection. A line-of-sight sensor may be a radar sensor, lidar sensor, image sensor (such as a camera, possibly a video camera), or other sensor. Referring again to FIG. 1, this figure illustrates how a sensor may be used to determine the arrangements of the buildings. For example, the sides of structures 20 and 22 facing the intersecting roads can be directly observed, along with the sides of structures 16 and 18 that face the road 32. However, the configuration of the side of the building 16 facing the road 34 and sidewalk 32 can be assumed to be parallel to the facing building 22 and the road 34.

In some examples, a position sensor is used to give the position of the vehicle, and the vehicle position is used to retrieve topographic data, such as a local arrangement of structures and roads. A structure may be any sound-reflecting object. For example, a structure may be: a man-made structure such as a building, bridge, wall, and the like; a geological feature such as a cliff; a tree, and the like. In an urban environment, structures typically include buildings.

For example, the local building configuration, and hence local topography, may be obtained from a database stored on a memory. The memory may be within the vehicle, for example as part of an improve apparatus according to the present invention, and may be updated using a wireless connection. The database may be a GPS database. In some examples, the building configuration can be determined from image data of the local roads.

In some examples, an acoustic model is not known initially, and time-dependent changes in the acoustic field are used to identify moving objects within an environment that is assumed to be unchanging.

The local environment may include any feature that appreciably contributes to the properties of the received acoustic signal. For example, structures within approximately 500 meters may be included, or within one city block in all directions of the vehicle.

Microphones

There may be a plurality of microphone arrays disposed around the vehicle. Filters may be used to modify microphone sensitivity to match the acoustic spectrum of a particular object. The same filters may be used for all microphones, or different filters used for different microphones.

Filters may include one or more of the following: mechanical modifications (e.g. resonance tuning) of the microphone cavity or environment, electronic filters (such as inductor-capacitor filters, and software filtering. For example, a filter may be configured to spectrally match the sound of an engine and/or road noise from the wheels of a second vehicle. A filter may be configured to match expected pedestrian noises such as speech, footsteps, and the like.

In some examples, a trim component may include acoustic cavities tuned to match the impedance of the microphone. For example, a vehicle trim component, such as a bumper cover (or bumper fascia) includes depressions on an inner surface (facing the vehicle). Microphones are located in register with the depressions so that the depressions act as acoustic resonators. The size and shape of the depressions can be chosen to provide an acoustic resonance within a frequency range of interest (such as within the acoustic range of engine noises).

Microphone signal data may be acquired at a scan rate that can be chosen based on factors such as desired accuracy, range of data acquisition, and computational speed. For example, a sampling rate of 44 kilohertz will provide an accurate representation of a sound wave frequency from 0-22 kilohertz using Nyquist theory. The scan rate may be in the range 1 KHz-100 kHz, or as desired. An acoustic range of approximately 20 kilohertz can be detected (before or after filtering), approximating the audio spectral range of the human ear. The spectral properties of a filter may be dynamically reconfigured, for example to improve sensitivity or assist selective tracking of an object.

The microphones may be MEMS microphones. The microphones may be supported on a flexible substrate, such as a flexible plastic substrate such as a tape-like substrate, and conformed to be located behind other vehicle components such as a trim piece. An example MEMS microphone includes a flexible silicon membrane proximate a rigid electrode, configured so that an acoustic signal induces movement of the flexible membrane and hence gives capacitive variations that can be electronically detected. Associated electronics, such as a transistor, an ASIC, or other circuitry, can be integrated with the MEMS microphone. A MEMS microphone may be flip-chip mounted or otherwise attached to a substrate having an electrode pattern, and the electrode pattern used to convey signals correlated with the acoustic signal to a processor. In some examples, the substrate is a ribbon cable. The substrate can be conformed to the inner (vehicle-side) surface of a trim component.

In a representative example, an electronic circuit, such as a processor, is used for analysis of signal data and estimation of object location. Microphone signals, correlated with the sound received by each microphone, can be the input signals to a processor. The processor can be pre-programmed to process the output signals from the microphones, and to provide an output signal to an output device, such as a display screen, or other device.

Matched Field Processing Theory

Matched field processing (MFP) is described in U.S. Pat. No. 6,227,036 and U.S. Pat. Pub. 2008/170472A1, both to Yönak, and example approaches described therein can be used in examples of the present invention.

MFP is a signal processing technique that uses microphone signals and an acoustic model of the environment in which the object (an acoustic source) is located. MFP allows the position of the object to be determined.

In an example approach, a signal from each microphone can be cast in to the frequency domain using a Fast Fourier Transform (FFT), and then comb filtered to leave the only the signal at the frequencies which are harmonics of the scan rate. The amplitude and phase at these signal harmonics is passed to the MFP routine. An acoustic model (a propagation model) for the environment of interest may be represented by the Green's function. A Green's function can be evaluated for each microphone (at signal frequencies of interest, such as signal harmonics) at each test location. Other approaches may be used.

Test locations may be distributed on a search grid that includes the actual object location to be determined. The test locations can cover a portion of the environment, and may be limited to roads and/or sidewalks. Test locations at more likely locations (for example, on the correct side of the road for a vehicle on a two-way street) may be evaluated earlier.

In an example approach, acoustic signal data (alternatively referred to as sound data) is collected with a plurality of microphones supported by the vehicle. The sound data received by the microphones is processed to form a cross spectral density matrix containing vectors of cross-correlations and auto-correlations within the collected acoustic data. A replica vector matrix is then constructed including sound data from at least one test sound at a plurality of predetermined locations within the environment is then constructed. The sound data vectors in the cross spectral density matrix are then projected on the replica vectors in the replica vector matrix to obtain a probability of the location of the sound source at each predetermined location within the environment. These probabilities form a distribution within the environment in which the largest probability distribution correlates with the location of the sound source.

An example approach is now described in more detail. A cross-spectral density matrix can be constructed by storing the acquired acoustic data in an array R, as follows:

$$\begin{bmatrix} R_1(t) \\ \vdots \\ R_m(t) \end{bmatrix} \quad (1)$$

where R represents acoustic data from a microphone, m is the microphone number, and t=time. This raw (unfiltered) sound data R includes the acoustic signal of interest and noise signals. The sound data array R contains both amplitude information and phase information related to the received acoustic data.

After the sound data is stored, the sound data in the time domain $R_m(t)$ is converted to the complex frequency domain $\hat{R}_m(f)$ for each element in the data array R. Any approach may be used to convert the time sound data $R_m(t)$ to the frequency domain, such as a fast Fourier transform.

The Frequency Domain Sound Data Array $$\begin{bmatrix} \hat{R}_1(f) \\ \vdots \\ \hat{R}_m(f) \end{bmatrix} \quad (2)$$

is filtered using at least one matched filter $\hat{F}^*(f)$ as follows:

$$\hat{M}_m(f) = \hat{R}_m(f) \cdot \hat{F}^*_i(f) \quad (3)$$

where i is the filter number, M is the filtered data array, and $\hat{F}^*_i(f)$ is the complex conjugate of the matched filter i. Each filter (1-i) may be chosen to match an acoustic signal from a different object.

For example, one filter may correspond to the engine and tire noises of a vehicle, a second filter may correspond to pedestrians, a third filter may correspond to a siren, and a fourth filter may correspond to a vehicle horn. A filter may be used to substantially eliminate, or at least reduce, noise and other extraneous signals from the unfiltered (raw) data $\hat{R}(f)$, and the filtered data is stored in $\hat{M}(f)$.

The filtered sound matrix $\hat{M}(f)$ is compared to a preset threshold for each of the filters i. In the event that the filtered noise matrix $\hat{M}(f)$ is less than the threshold for each filter, indicative that none of the sounds for which detection is desired is present, the above processes are repeated.

If the filtered sound matrix $\hat{M}(f)$ is greater than the threshold for one or more of the filters i, the data $\hat{M}_m(f_n)$ is stored in a data vector matrix $D_n$ as follows:

$$D_n = \begin{bmatrix} \hat{M}_1(f_n) \\ \hat{M}_2(f_n) \\ \vdots \\ \hat{M}_m(f_n) \end{bmatrix} \quad (4)$$

The Hermitian transpose $D_n^H$ is then constructed as follows:

$$D_n^H = [\hat{M}^*_1(f_n) \hat{M}^*_2(f_n) \hat{M}^*_3(f_n) \ldots \hat{M}^*_m(f_n)] \quad (5)$$

The data contained within both the data vector matrix $D_n$ as well as its Hermitian transpose $D_n^H$ are non-normalized and contain all of the amplitude and phase information for all of the microphones and for all of the sample frequencies n. Both data vector matrices can then be normalized as follows:

$$d_n = \frac{D_n}{|D_n|} \quad (6)$$

$$d_n^H = \frac{D_n^H}{|D_n^H|} \quad (7)$$

where $d_n$ is the normalized vector matrix, and $d_n^H$ is the Hermitian transpose of $d_n$. The normalized data vector matrix d is then multiplied by its Hermitian transpose $d^H$ as follows:

$$K = dd^H \quad (8)$$

where K is a cross spectral density matrix, which equates to the following:

$$K = \quad (9)$$

$$\frac{1}{|D|^2} \begin{bmatrix} \hat{M}_1(f)\hat{M}^*_1(f) & \hat{M}_1(f)\hat{M}^*_2(f) & \hat{M}_1(f)\hat{M}^*_3(f) & \ldots & \hat{M}_1(f)\hat{M}^*_m(f) \\ \hat{M}_2(f)\hat{M}^*_1(f) & \hat{M}_2(f)\hat{M}^*_2(f) & \hat{M}_2(f)\hat{M}^*_3(f) & \ldots & \hat{M}_2(f)\hat{M}^*_m(f) \\ \hat{M}_3(f)\hat{M}^*_1(f) & \hat{M}_3(f)\hat{M}^*_2(f) & \hat{M}_3(f)\hat{M}^*_3(f) & \ldots & \hat{M}_3(f)\hat{M}^*_m(f) \\ \vdots & \vdots & \vdots & & \vdots \\ \hat{M}_m(f)\hat{M}^*_1(f) & \hat{M}_m(f)\hat{M}^*_2(f) & \hat{M}_m(f)\hat{M}^*_3(f) & \ldots & \hat{M}_m(f)\hat{M}^*_m(f) \end{bmatrix}$$

As can be seen from the above equation, the cross spectral density matrix contains all of the cross correlations and auto correlations for all of the microphones $M_1$-$M_m$ measurements made during the data acquisition. Once identification of the sound wave of interest and construction of the cross spectral density matrix, localization of the detected sound source can begin.

A propagation model for the environment is used to perform localization of the detected object (the sound source). One such propagation model comprises the Green's function that solves the Helmholtz equation and accounts for acoustic properties of the environment including reflective boundaries that may cause echoes. Different Green's functions can be used for different environmental topologies. For example, a Green's function for flat open country differs from a Green's function for a city block including many buildings and other reflective surfaces.

Green's functions are typically determined empirically and a plurality of different Green's functions may be stored within a memory accessible by the processor. The appropriate Green's function can be selected depending upon the vehicle environment, for example using a position signal from a position sensor, such as a GPS. Alternatively, or in addition, the topology of the environment can be determined by one or more sensors such as laser, radar, and/or other sensors.

A replica vector matrix is created using the appropriate Green's function G at each sample frequency and for each microphone 1-m. In order to construct the replica vector matrix, a grid is mathematically imposed upon the environment of interest, e.g. within 500 meters or one block of the vehicle. The environment can be defined to include any structures that appreciably modify the received acoustic signal. The Green's function is then used to calculate both the amplitude and phase data for each microphone at each sample frequency f for each grid crossing to form the replica vector matrix $\Phi$ as follows:

$$\hat{G}(f, \vec{x}_m | \vec{x}_t) \tag{10}$$

where $x_t$ is the test sound location, $x_m$ is the location of the microphone, G is Green's function, and f is frequency. The replica vector $\Phi$ is then constructed as follows:

$$\Phi(f, \vec{x}_t) = \begin{bmatrix} \hat{G}(f, \vec{x}_1 | \vec{x}_t) \\ \hat{G}(\vec{x}_2 | \vec{x}_t) \\ \hat{G}(\vec{x}_3 | \vec{x}_t) \\ \vdots \\ \hat{G}(\vec{x}_m | \vec{x}_t) \end{bmatrix} \tag{11}$$

where $\Phi(f, \vec{x}_t)$=replica vector matrix. The complex or Hermitian transpose of the replica vector matrix is also constructed as follows $$\Phi^H(\vec{x}_t) = [\hat{G}^*(f, \vec{x}_1 | \vec{x}_t) \hat{G}^*(f, \vec{x}_2 | \vec{x}_t) \hat{G}^*(f, \vec{x}_3 | \vec{x}_t) \ldots \hat{G}^*(f, \vec{x}_m | \vec{x}_t)] \tag{12}$$

where $\Phi^H(f, \vec{x}_t)$ is the Hermitian transpose of $\Phi(f, \vec{x}_t)$. The cross spectral density matrix K is projected on the normalized replica vectors for each sample frequency using the Bartlett processor $B^{Bart}$ as follows:

$$B^{Bart}(f, \vec{x}_t) = \frac{\Phi^H(f, \vec{x}_t) K \Phi(f, \vec{x}_t)}{|\Phi(f, \vec{x})|^2} \tag{13}$$

The Bartlett processor produces a single value for each frequency and for each test point in the environment, i.e. each grid intersection in the example given and for each frequency band segment n. The Bartlett processor thus provides a probability distribution throughout the grid of where the detected audio signal of interest is located. In practice, the probability distribution provided by the Bartlett calculations will generate a greater numerical value in the area of the actual sound source of interest is located.

Following the calculation of the Bartlett value for each frequency, an incoherent average may be used to sum the various sample frequencies for each test location in the environment to obtain the broadband Bartlett value as follows:

$$B^{Bart}_{Broadband}(f, \vec{x}_t) = \int_{f_{lo}}^{f_{hi}} B^{Bart}(f, \vec{x}_t) df \tag{14}$$

As an alternative to the Bartlett processor, an MV processor may be used to compute the probabilities within the environment as follows:

$$B^{MV}(f, \vec{x}_t) = \frac{|\Phi(f, \vec{x}_t)^2|}{\Phi^H(f, \vec{x}_t) K^{-1} \Phi(f, \vec{x}_t)} \tag{15}$$

where $B^{MV}$ is the MV processor, and its incoherent errors calculated as follows $$B^{MV}_{Broadband}(f, \vec{x}_t) = \int_{f_{lo}}^{f_{hi}} B^{MV}(f, \vec{x}_t) df \tag{16}$$

The location of the sound source can then outputted by the processor to an output device, such as a warning device.

Hence, examples of the present invention include methods and apparatus for identifying and localizing any of a plurality of different acoustic signals of interest. Correlations of the various echoes and other reflections of sound waves within a particular environment can be determined for when using an acoustic model of the environment, allowing more accurate localization of any desired sound signal source.

The invention is not restricted to the illustrative examples described above. Examples described are exemplary, and are not intended to limit the scope of the invention. Changes therein, other combinations of elements, and other uses will occur to those skilled in the art. The scope of the invention is defined by the scope of the claims.

Having described our invention, we claim:

1. A method of assisting avoidance of a collision between a vehicle and an object, the vehicle being a land vehicle, the object and the vehicle being located within an environment, the method comprising:
   obtaining topographic data relating to the environment, the topographic data including a spatial arrangement of structures within the environment;
   receiving an acoustic signal from the object using microphones supported by the vehicle, said acoustic signal including acoustic data from areas in the environment outside the line of sight from said vehicle due to diffraction and reflection of the acoustic data;
   creating an acoustic model of the environment using the topographic data relating to the environment, the acoustic model being a model of acoustic properties of the environment and including areas outside the line of sight from the vehicle;
   determining a position of the object using the acoustic signal and the acoustic model of the environment, the object being out of a direct line of sight from the vehicle; and
   identifying the object by spectral analysis of the acoustic signal,
   the structures including a structure that blocks a direct view of the object from the vehicle,
   the object being a second vehicle, a pedestrian, or an animal,
   activating an alert device which generates a visual, audible, or haptic alert.

2. The method of claim 1, the structures including buildings.

3. The method of claim 1, the environment including an intersection between a first road and a second road,
the vehicle being on the first road,
the object being on the second road,
the structure that blocks a direct view of the object from the vehicle being a building proximate the intersection.

4. The method of claim 3, the topographic data including an arrangement of buildings proximate the intersection.

5. The method of claim 4, the topographic data including data from a sensor system, the sensor system including one or more sensors from the group consisting of a radar sensor, a laser sensor, a lidar sensor, and an image sensor.

6. The method of claim 4, the intersection being identified using a position sensor on the vehicle,
the topographic data including a previously determined arrangement of structures within the environment.

7. The method of claim 6, the position sensor being a global positioning system (GPS),
the acoustic model being created using an approximate intersection geometry obtained using GPS data.

8. The method of claim 1, the location of the object being obtained from the acoustic signal using matched field processing.

9. The method of claim 8, the matched field processing being performed by processor, the processor receiving signal data from the microphones.

10. The method of claim 1, the acoustic signal being obtained using a microphone array located beneath a trim element of the vehicle.

11. A method of assisting collision avoidance between a vehicle and an object within an environment, the vehicle being a land vehicle, the method comprising:
obtaining topographic data relating to the environment, the topographic data including a spatial arrangement of structures within the environment;
receiving an acoustic signal from the object using microphones supported by the vehicle, said acoustic signal including acoustic data from areas in the environment outside the line of sight from said vehicle due to diffraction and reflection of the acoustic data;
creating an acoustic model of the environment using the topographic data, the acoustic model being a model of acoustic properties of the environment and including areas outside the line of sight from the vehicle;
locating the object using matched field processing of the acoustic signal, using the acoustic model of the environment; and
providing an alert so as to assist avoidance of a collision between the vehicle and the object,
the object being a second vehicle, a pedestrian, or an animal,
the object being hidden from view from the vehicle,
the object being identified by spectral analysis of the acoustic signal,
activating an alert device which generates a visual, audible, or haptic alert.

12. The method of claim 11, the environment including an intersection of a first road and a second road,
the vehicle being on the first road, and
the object being a second vehicle on the second road,
the second vehicle being visually concealed from the vehicle by a building proximate the intersection.

13. The method of claim 11, the object being a pedestrian.

14. The method of claim 11, further comprising filtering the acoustic signal using a filter matched to the acoustic signal from the object.

15. The method of claim 11, further including:
determining the position of the vehicle using a position sensor;
the topographic data including an arrangement of buildings within the environment.

16. The method of claim 11, the environment including the vehicle and the object, the topographic data including the arrangement of structures within 500 meters of the vehicle or the object.

17. An apparatus operable to assist avoidance of a collision between a vehicle and an object within an environment, the object being a collision hazard out of direct line of sight from the vehicle, the object producing an acoustic signal, the apparatus comprising:
microphones supported by the vehicle and operable to receive the acoustic signal, said acoustic signal including acoustic data from areas in the environment outside the line of sight from said vehicle due to diffraction and reflection of the acoustic data;
a matched field processor, receiving microphone signals from the microphones, and operable to use an acoustic model of the environment to determine the location of the object within the environment and including areas outside the line of sight from the vehicle; and
an alert device, operable to provide an alert indicative of the location of the object, the location being out of direct line of sight from the vehicle, said alert device activated upon location of the object at said location out of direct line of sight from the vehicle,
the vehicle being a land vehicle,
the microphones being located behind a trim component of the vehicle,
the matched field processor being provided by a computer having a processor, a memory, and a clock,
the apparatus generating the acoustic model of the environment from topographic data relating to the environment, the topographic data including a spatial arrangement of structures within the environment,
the matched field processor determining the location of the object using matched field processing.

18. The apparatus of claim 17, the trim component being a bumper cover.

19. The apparatus of claim 18, the trim component including depressions aligned with the microphones so as to act as acoustic cavities.

20. The apparatus of claim 17, the object being a second vehicle or a pedestrian.

21. The apparatus of claim 17, further including a position sensor providing a position signal,
the position signal being used to determine the acoustic model of the environment.

22. The apparatus of claim 21, the apparatus further including a memory including a database of topographic data, the position signal being used to retrieve topographic data for the environment.

23. The apparatus of claim 17, the apparatus further including a filter operable to remove noise from the received acoustic signal, the filter being a band-pass filter having a lower band-pass frequency and an upper band-pass frequency,
the lower band-pass frequency being between 10 Hz and 1 kHz,
the upper band-pass frequency being between 2 kHz and 20 kHz.

* * * * *